(No Model.)
F. P. GROSSCUP.
HAY CARRIER.
No. 293,452. Patented Feb. 12, 1884.
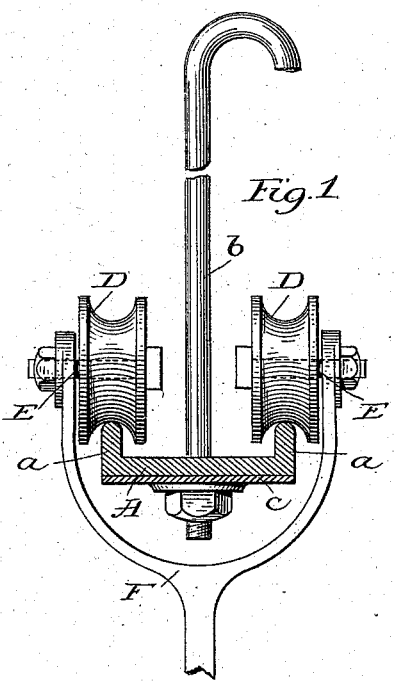
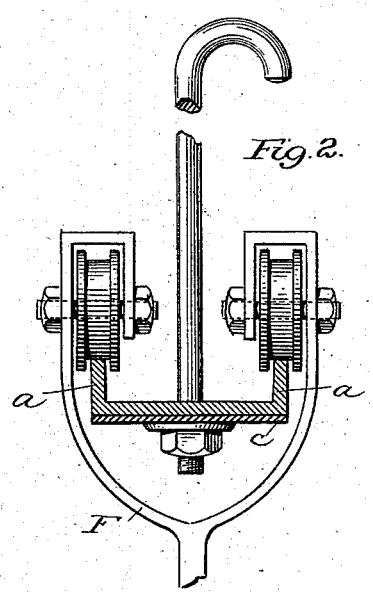
Attest:
Inventor
Fred Paul Grosscup
by Joyce & Spear
Attys.

UNITED STATES PATENT OFFICE.

FRED PAUL GROSSCUP, OF COLUMBUS, OHIO, ASSIGNOR TO THE COLUMBUS HAY TOOL COMPANY, OF SAME PLACE.

HAY-CARRIER.

SPECIFICATION forming part of Letters Patent No. 293,452, dated February 12, 1884.

Application filed November 30, 1883. (No model.)

*To all whom it may concern:*

Be it known that I, FRED PAUL GROSSCUP, of Columbus, in the county of Franklin and State of Ohio, have invented a new and useful Improvement in Hay-Carriers, and I do hereby declare that the following is a full, clear, and exact description of the same.

My invention relates to an improved track or way for supporting and carrying a hay elevator and carrier.

The improvement consists, partly, in a double trackway composed of sections of channel-iron with re-enforcing plates at the supporting-points, and in details of construction fully hereinafter explained.

In the drawings which accompany this specification, Figure 1 shows, in cross-section, one form of track. Fig. 2 shows another form of track and carrier-truck.

A represents the track, which is composed of sections of channel-iron of any suitable length. In the form shown in Fig. 1 the upturned flanges *a a* are rounded on the edge, which forms the bearing-surface for the rounded tread of the wheels of the truck. The track is suspended from the roof of the barn or elsewhere by rods *b*, the lower ends of which pass down through holes in the sections of track. In tracks of this sort it is desirable to have the track as light as possible. The track must also be of uniform strength though, as it is necessarily weakened at the holes for the suspending-rods. I have provided re-enforcing plates *c*, which are placed underneath the track, and through which the supporting-rods pass. These plates are preferably as wide as the track, and may be of length suited to the purpose. The rod passing through the track and plate is provided with a nut, *d*, underneath the plate, and thus the track rests upon the plate, and is made as strong at this as at the other points.

The truck of the carrier is composed of wheels D D, running loosely on journals E E, from which is suspended the hanger F, which supports the lifting and conveying mechanism, of any desirable kind.

In Fig. 2 the flanges which form the rails have square bearing-surfaces, the tread of the wheel being of corresponding shape, with right-angled flanges. The hanger F (shown in this figure) is bent over the wheels of the carrier on both sides, so that bearings are formed for both ends of the pin upon which the carrier-wheels turn. The adjoining ends of the track are connected by means of a plate similar to the plate *c*, and both passing through the track and plate.

As will readily be seen, the device is simply and cheaply constructed, occupies little room, and is easily attached to and disconnected from its place of support. The rails may be rolled in the ordinary manner.

I claim as my invention—

A way or track for an elevator, of channel-iron, in combination with re-enforcing plates and suspension-rods passing through said channel-iron and plate, substantially as described.

In testimony whereof I have signed my name to this specification in presence of two subscribing witnesses.

FRED PAUL GROSSCUP.

Witnesses:
L. W. SEELY,
W. C. DUVALL.